April 20, 1926.
F. E. HOSMER
1,581,212
RECOVERING GASOLINE
Filed May 14, 1920
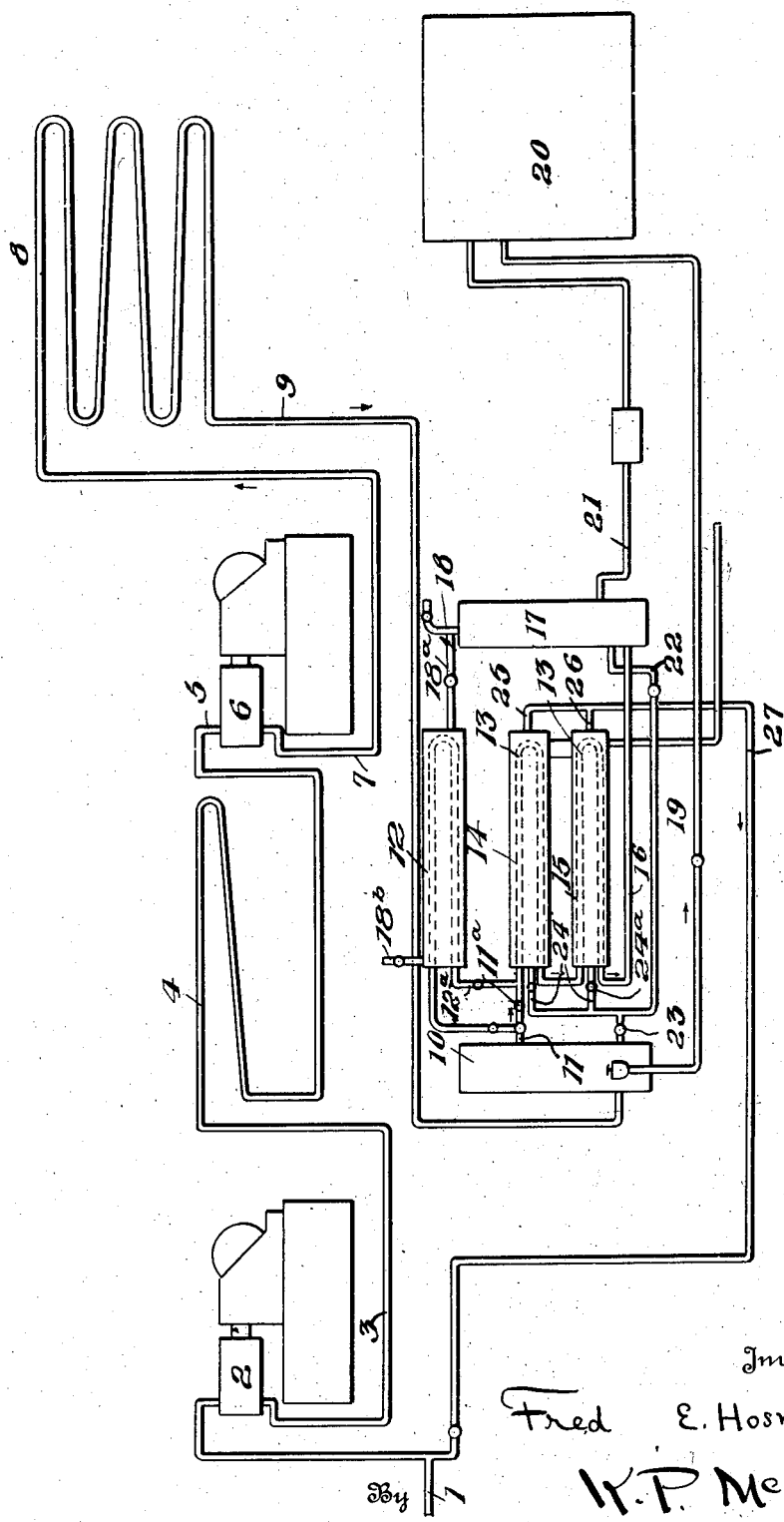
Inventor
Fred E. Hosmer
By W. P. McElroy
Attorney Patented Apr. 20, 1926.

1,581,212

UNITED STATES PATENT OFFICE.

FRED E. HOSMER, OF FORT WORTH, TEXAS.

RECOVERING GASOLINE.

Application filed May 14, 1920. Serial No. 381,326.

*To all whom it may concern:*

Be it known that I, FRED E. HOSMER, a citizen of the United States, residing at Fort Worth, in the county of Tarrant and State of Texas, have invented certain new and useful Improvements in Recovering Gasoline, of which the following is a specification.

This invention relates to recovering gasoline; and it comprises a method of recovering gasoline from natural gas wherein such gas is placed under pressure by a suitable pump, is cooled to cause it to deposit condensable gasoline and is then further supercooled by causing an evaporation of condensed gasoline in heat removing relationship thereto, thereby depositing a further portion of gasoline; the gasoline vapors produced in such evaporation being returned to the gas inlet of said pump; all as more fully hereinafter set forth and as claimed.

It is the object of the present invention to provide a simple, ready and economical method of recovering condensable hydrocarbons or gasoline from natural gas, casinghead gas, etc., containing the same; using a high degree of cooling in connection with compression and attaining the cooling by the action of a portion of the condensed volatile products recovered. In the recovery of gasoline from natural gas and the like, compression is often used and in addition to the compression there is a certain degree of cooling employed. But in all the methods involving supercooling, the supercooling is derived from outside sources or by the expansion of a compressed gas. The methods and apparatus proposed are unduly complicated and unduly costly.

In the present invention I have devised a simple method of recovering gasoline and other volatile liquids from natural gas and other gases containing vapors wherein pressure and cooling are employed, but wherein only a relatively low compression is used and expensive refrigeration machinery is not necessary. In this method I take the gas to be treated into the suction side of a suitable compression pump and compress it as may be desired, say, to about 125 pounds per square inch. Higher or lower pressures may be used but with most gas, operating under the present invention, about 125 pounds pressure works very well. From this pump the compressed gas is taken to an ordinary type of cooler, air cooled or water cooled as the case may be, to rid it of the heat of compression. A certain amount of condensable liquid (gasoline) is ordinarily produced and this is collected in a trap tank. The cooled compressed gas now enters refrigerating coils in a closed casing and is exposed to the evaporation of a certain amount of condensed gasoline outside the coils. This causes a supercooling effect and results in the production of a further amount of gasoline which is caught in another trap tank. The gasoline used for refrigeration may come from either trap tank. The gasoline vapors produced by evaporation in the refrigerating apparatus enclosing the refrigerating coils are sent back to the suction pipe of the pump and rejoin gas going through the system. The gas after this supercooling is of course very cold and is under pressure. Either the cold or the pressure, or both may be utilized in the present invention or may be applied to other uses; this depending on local conditions. For example, the cold may be used for precooling the gas going to the supercooling device; an ordinary heat exchanger being used. Or if it is not desired to use the pressure of the stripped gas for line pressure, or all of such pressure, the stripped gas may be expanded into the precooler, giving an additional cooling effect equivalent to the amount of pressure released.

In many installations gas is drawn from the field line by a suction pump or vacuum pump. In this event, the gases coming from the vacuum pump may be delivered to the compression pump and the return of gasoline vapors from the refrigerating coils may be back to the suction pump operating on the field line. By so doing, a higher degree of suction is available in the refrigerating apparatus and a higher degree of cold may be attained.

In the described method it will be noted that no outside medium is employed for refrigeration. A little of the condensed gasoline is temporarily withdrawn from the collecting tanks, is used to produce refrigeration and is then sent back into the system to go once more to the collecting tanks. In so operating, there is, so to speak, a local excess of gasoline vapor; the concentration or partial pressure of gasoline vapor in the gas undergoing compression and cooling is greater than that normal to the gas.

In the accompanying illustration I have shown, more or less diagrammatically, a complete installation adapted to treat gas from a well or from a gas line, as the case may be. In this showing the figure is in elevation.

In the showing element 1 indicates a source of gas to be treated. With this source of gas communicates suction pump 2, discharging gas under more or less pressure through 3. The gas is cooled in diagrammatically shown cooler 4, using water or air as the case may be, and passes thence through inlet 5 to compression pump 6 wherein it is placed under such pressure as may be desired. Compressed gas with the heat of compression passes out of the pump through pipe 7 going thence to cooler 8, which may be, as before, either water cooled or air cooled. In this cooler the compressed gas ordinarily deposits more or less gasoline which passes together with uncondensed gas by means of conduit 9 to trap tank 10, wherein the liquid is separated from the gas. From the trap tank the gas may, as shown go by 11, alternatively, directly to supercooling coils 13 (shown in dotted lines) in expansion casings 14 and 15, or it may go first through precooler 12. Branch line 12$^a$ leads from 11 through the precooler back to 11. Line 11 is valved at 11$^a$. From the supercoolers the gas emerges, thoroughly chilled, by pipe 16, leading to a second trap tank or liquid separating device 17. From 17 cold dry gas, still under pressure, emerges at 18 and is led to any suitable place of use (not shown). As much cold dry gas as may be desired may be led by 18$^a$ to the precooler casing (12), wherein it may be allowed to expand to such extent as may be desired. From the precooler casing gas is vented at 18$^b$. Condensed liquid in the first trap tank may pass by means of valved line 19 to a stock tank 20. Condensed liquid from the second trap tank may similarly pass to the same stock tank by means of line 21. Returning to the refrigerating casings (14 and 15), they are supplied through suitable expansion nozzles with a portion of the condensed gasoline which evaporates within them to produce cold. This condensed gasoline may be drawn from the second trap tank through valved line 22 or from the first trap tank through valved outlet 23. In either case it enters the interior of the refrigerating devices through 24. Evaporating within the refrigerating devices the gasoline vapors produced leave the devices through 25 and 26, and are taken by line 27 back to the suction side of the suction pump. Suction pumps, such as that here described, are often carried under a substantial degree of vacuum on the field or well side; sometimes the vacuum being quite high. With a fair degree of vacuum on the suction side of this pump and with the connections described, a high degree of supercooling can be produced in the refrigerating devices.

While I have described the present process and apparatus as particularly applicable to the recovery of gasoline from natural gas, it is obvious that they may be equally well applied to the recovery of any other volatile liquid from gases carrying the same, as in the treatment of coke oven gases to recover light benzol, the treatment of various industrial gases carrying alcohol, acetone, etc., to any other purposes to which they may be adapted.

Liquid condensates from 10 or 17 entering the supercooler casings pass through suitable expansion valves or nozzles; as does gas from 18 entering the precooler casing.

What I claim is:—

In the recovery of vapors from gases, the process which comprises supplying the gas together with a certain amount of additional vapors directly to the suction side of a pump, compressing and cooling the mixed gas and vapors, further precooling by heat transfer to cold dry tail gas, supercooling by evaporation of a portion of the liquid condensed in said various operations, returning the vapors produced in said evaporation back to the suction side of said pump and returning cold dry tail gases coming from the supercooling operation back for precooling.

In testimony whereof, I affix my signature hereto.

FRED E. HOSMER.